(12) United States Patent
Vakayil et al.

(10) Patent No.: US 8,454,932 B2
(45) Date of Patent: *Jun. 4, 2013

(54) TITANIUM DIOXIDE NANOPARTICLES

(75) Inventors: Ahmed Y. Vakayil, Jeddah (SA); Sami M. Bashir, Jeddah (SA); Fadi M. S. Trabzuni, Jeddah (SA)

(73) Assignee: The National Titanium Dioxide Co., Ltd. (CRISTAL), Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,316

(22) Filed: Jul. 9, 2012

(65) Prior Publication Data

US 2012/0276389 A1  Nov. 1, 2012

Related U.S. Application Data

(63) Continuation of application No. 12/584,699, filed on Sep. 10, 2009, now Pat. No. 8,226,911.

(51) Int. Cl.
*C01G 23/053* (2006.01)

(52) U.S. Cl.
USPC ............................... 423/610; 423/85

(58) Field of Classification Search
USPC ................................................ 423/610, 85
See application file for complete search history.

(56) References Cited

U.S. PATENT DOCUMENTS

| 4,923,682 | A | 5/1990 | Roberts et al. |
| 5,468,463 | A | 11/1995 | Butje et al. |
| 6,517,804 | B1 | 2/2003 | Kim et al. |
| 2005/0031876 | A1* | 2/2005 | Lu et al. .......... 428/428 |
| 2005/0059541 | A1* | 3/2005 | Hirao et al. .......... 501/87 |
| 2006/0003229 | A1* | 1/2006 | Sai-Cheong et al. ...... 429/231.6 |

OTHER PUBLICATIONS

Notification of Transmittal of the International Seach Report and the Written Opinion of the International Searching Authority, or the Declaration, Form PCT/ISA/220, for PCT/US2010/046629, dated May 18, 2011.
International Search Report, Form PCT/ISA/210, for PCT/US2010/046629, dated May 18, 2011, transmitted with Form PCT/ISA/220.
Written Opinion of the International Searching Authority, Form PCT/ISA/237, for PCT/US2010/046629, dated May 18, 2011, transmitted with Form PCT/ISA/220.
Sun-Jae Kim et al., Homogeneous precipitation of TiO2 ultrafine powders solution; J. Am. Ceram. Soc., vol. 82, 1999, 927-932 (Abstract Only).

* cited by examiner

*Primary Examiner* — Steven Bos
(74) *Attorney, Agent, or Firm* — Kilyk & Bowersox, P.L.L.C.

(57) ABSTRACT

$TiO_2$ nanoparticles and methods of producing the same are provided. The nanoparticles can be processed by neutralization, calcination, and/or micronization. The $TiO_2$ nanoparticle size is controlled by controlling synthetic and process conditions. $TiO_2$ nanoparticles produced are of the anatase polymorph, of the rutile polymorph, or a mixture thereof, and have particle sizes in the range of from 10 nm to 100 nm.

19 Claims, 2 Drawing Sheets ized TiO$_2$ are centered towards its ability to interact effec-
TITANIUM DIOXIDE NANOPARTICLES

CROSS-REFERENCE TO RELATED APPLICATION

The present application is a continuation of U.S. patent application Ser. No. 12/584,699, filed Sep. 10, 2009, now U.S. Pat. No. 8,226,911 B2, which is incorporated herein in its entirety by reference.

FIELD

The present teachings relate to the field of synthesizing and processing nanoparticles, for example, to be used in coating and photo-catalysis applications.

BACKGROUND

Titanium dioxide (TiO$_2$) exists in three polymorphs, namely, anatase, rutile, and brookite. Out of these, anatase and rutile are of commercial significance as pigments in manufacturing paints, papers, plastics, ceramics, inks, and the like. When used as pigment, TiO$_2$ generally has an average particle size in the micron range. TiO$_2$ particles of smaller average particle size (i.e. below 100 nm) are generally referred to as nano-sized TiO$_2$ particles or nanoparticles. In the last decade, TiO$_2$ nanoparticles began to emerge in advanced commercial applications such as in cosmetic and personal care products, in self-cleaning coatings, and in photocatalysis related applications.

Most of the advanced technological applications of nano-sized TiO$_2$ are centered towards its ability to interact effectively with light in wavelengths below the visible region (290 nm to 400 nm). In this region, light energy and electron band gap energy of TiO$_2$ are compatible or equivalent to ensure effective interaction of TiO$_2$ material with UV light. According to band-gap theory, energy band gap increases as crystal size decreases. Therefore, reducing the crystal size can ensure increased band gap energy rendering TiO$_2$ an efficient photoactive material capable of absorbing a wide range of light particularly in the lower visible and UV regions.

Although small crystal or particle size plays a major role in determining the efficiency of TiO$_2$ as a photo-active material, other parameters, such as crystal structure and shape, surface nature and morphology, and crystalline ionic content or doping, can greatly influence its efficiency. These parameters can be influenced by the synthetic or process parameters used in the making of the TiO$_2$ nanoparticle material.

Preparation of TiO$_2$ powders using forced-hydrolysis method have been thoroughly studied in academia and have been successfully applied in industry in what is known as the Sulphate Process. U.S. Pat. No. 4,944,936 describes the production of hydrated TiO$_2$ in rutile form with narrow particle size, using a forced-hydrolysis method in the presence of TiO$_2$ nuclei.

U.S. Pat. No. 6,001,326 describes a process for producing monodispersed and crystalline titanium dioxide from a titanyl chloride solution through spontaneous precipitation. The process, however, does not lead to complete crystallization of anatase or rutile. This affects the thermal stability of the product as well. Similarly the yield of various experiments mentioned in the patent is between 87% and 95%, which limits commercialization.

U.S. Pat. No. 6,517,804 B1 describes the low temperature preparation of ultrafine TiO$_2$ rutile powder with large surface area and the use of it as a photocatalyst. The feedstock material is TiCl$_4$. Ice pieces were used to produce titanium oxychloride solution after dilution of oxychloride using distilled water. TiO$_2$ was precipitated by standing from 2 to 20 hours at a temperature in the range of from 15° C. to 70° C. The reaction time and yield, however, limit commercialization. The produced particles are not spherical, but are downy hair shaped.

U.S. Pat. No. 6,440,383 B1 provides a hydrometallurgical process for producing ultrafine or nano-sized titanium dioxide from titanium containing solutions, particularly titanium chloride solutions. The process is conducted by total evaporation of the solution in a spray drier, above the boiling point of the solution and below the temperature where there is significant crystal growth. Particle size is controlled by chemical control additives like phosphoric acid or salts of metals. The solid TiO$_2$ formed is washed and calcined at elevated temperature to induce crystallisation. The recovery of highly corrosive gaseous HCl, however, along with un-hydrolyzed titanium oxychloride, are major problems impeding commercialization.

SUMMARY

According to various embodiments of the present teachings, commercially-viable methods and processes are provided to produce TiO$_2$ nanoparticles of different desired crystalline sizes, structures, and ionic contents. The different TiO$_2$ nanoparticles can be used for different advanced properties and can provide benefits to a wide range of advanced commercial applications.

Major differences between the products of the present teachings and those of the literature include, but are not limited to, the ability to produce ultrafine titanium dioxide anatase crystal powder having spherical shape and a particle size of from 10 nm to 30 nm. In some embodiments, the method uses an aqueous titanium oxychloride solution without adding any titanium dioxide crystal nucleating agents, and the thermal hydrolysis is carried out at a temperature in the range of from 95° C. to 105° C., for example, at atmospheric pressure. In some embodiments, sulphate ions are introduced to the titanium oxychloride solution before starting the precipitation in order to enhance formation of the anatase phase polymorph. Anatase nuclei are formed in-situ in the presence of sulphate ions and hence there is no addition of any nucleating agent. Similarly, aluminium ions can be added to enhance formation of the rutile phase polymorph having a spherical shape. The precipitated hydrous titanium dioxide can be neutralized before filtration to achieve a maximum yield, to enhance filtration, and to avoid the discharge of a large quantity of highly acidic effluent. As discussed herein, the neutralization improved the yield to above 99%, which is not seen in any of the literature. The precipitate can then be dried and calcined to increase crystallinity.

In some embodiments, both drying and calcination steps can be included together. The calcination step can be used to enhance the crystallinity and thermal stability of the product. The product can be micronized in a fluid energy mill. According to various embodiments, the product obtained exhibits excellent photoactivity and enhanced absorbance of UV radiations.

In some embodiments, the present teachings relate to a hydrolysis method to synthesize TiO$_2$ particulate material with particle sizes in a range of from 10 nanometers (nm) to 100 nm. The particulate material can further be processed to produce nanoparticle TiO$_2$ materials, for example, suitable for coatings or for photo-catalytic applications. In various embodiments, hydrolysis or process step conditions can be variously controlled to produce a desired particle type and particle size, for example, to produce $TiO_2$ nanoparticles. In some embodiments, the $TiO_2$ nanoparticles produced can comprise mainly the anatase form or mainly the rutile form, and/or can have average particle sizes of from 10 nm to 100 nm, for example, average diameters and/or average maximum particle dimensions.

According to various embodiments, a synthetic method to manufacture $TiO_2$ nanoparticles is provided. The synthetic method can involve a forced-hydrolysis of $Ti^{4+}$ aqua-ions to precipitate $TiO_2$ nanoparticles. The $TiO_2$ nanoparticles can comprise the anatase form or the rutile form depending on the concentration of $Ti^{4+}$ aqua-ions and the presence of either $SO_4^{2-}$ anions or $Al^{3+}$ cations in the reaction medium. For example, nanoparticles produced from a high concentration of $Ti^{4+}$ ions, in the presence of 0.32 molar % $Al^{3+}$ ions with respect to the amount of $Ti^{4+}$ ions, exhibited the rutile polymorph. An exemplary high concentration would be a percentage solution comprising from 12% $Ti^{4+}$ to 14% $Ti^{4+}$ (w/v). In another example, the formation of anatase nanoparticles is driven by a $Ti^{4+}$ molar concentration of from 3.3% to 9% (w/v) in an aqueous titanium oxychloride feedstock. In some embodiments, the presence of $SO_4^{2-}$ anions at levels of from 5% to 6% with respect to the molar percentage of Ti was used to drive the formation of the anatase polymorph rather than the rutile polymorph.

In some embodiments, $TiO_2$ nanoparticles for use in coating and photo-catalysis applications are provided, wherein the $TiO_2$ nanoparticles are further processed by drying to form a dry product with enhanced crystallinity, low ionic content, and optimum surface area. In an exemplary method, the processing steps can comprise neutralization, filtration, calcination, and micronization.

In some embodiments, methods using different reaction conditions, such as ionic concentrations and types of added ions, enable the formation of different $TiO_2$ polymorphs. Further processing of the $TiO_2$ produced can be performed, for example, to optimize applicability for coating and/or photo-catalysis applications. Such further processing steps can comprise, for example, neutralization, micronization, calcination, a combination thereof, and the like.

BRIEF DESCRIPTION OF THE DRAWINGS

The present teachings will be described with reference to the accompanying drawings. The drawings are intended to illustrate, not limit, the present teachings.

DETAILED DESCRIPTION

Figure 1:
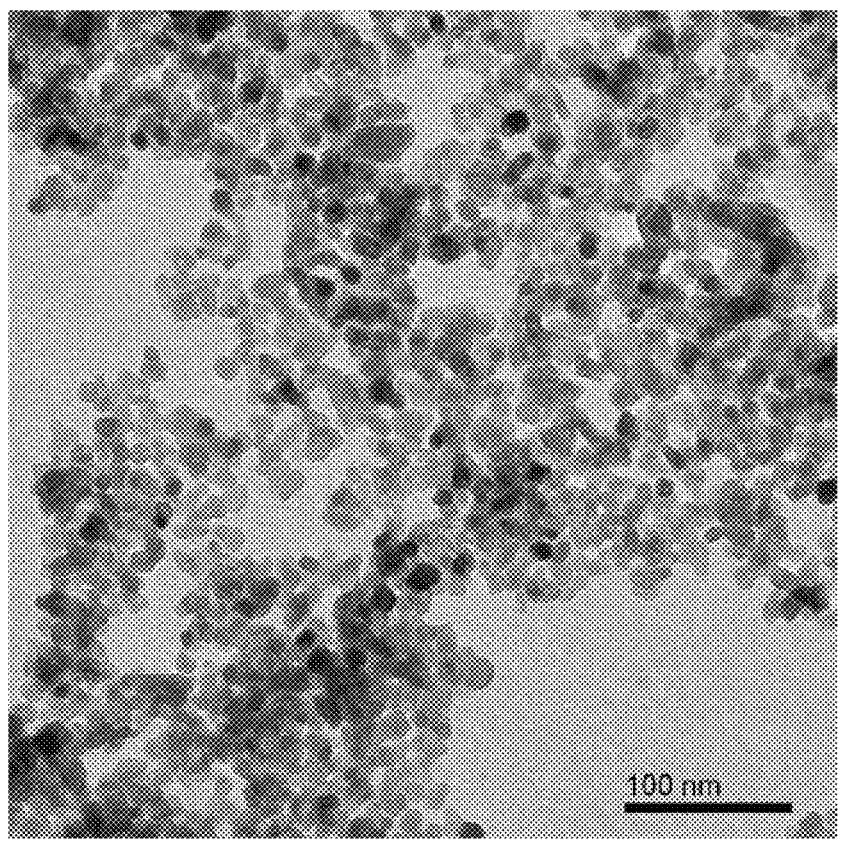
FIG. 1 is a TEM image of anatase titanium dioxide nanoparticles produced in accordance with the embodiment of the present teachings described in connection with Example 3.

According to various embodiments of the present teachings, a method is provided for manufacturing titanium dioxide crystalline powders. The method comprises thermally hydrolyzing an aqueous titanium oxychloride solution that is free of titanium dioxide nucleating agents. The resultant suspension is then neutralized and the resultant neutralized product is filtered. The filtered neutralized product is then calcined. In some embodiments, the titanium oxychloride solution can comprise from 0.5 mole to 3 moles of titanium ions, for example, TiO2, per liter of solution, for example, from 0.687 mole to 2.5 moles, from 1.375 moles to 2.25 moles, or from 1.875 moles to 2.0 moles, per liter of solution.

The calcined product can exhibit a specific surface area of at least from 50 $m^2/g$, for example, of from 50 $m^2/g$ to 300 $m^2/g$, from 60 $m^2/g$ to 200 $m^2/g$, from 75 $m^2/g$ to 150 $m^2/g$, or of at least 100 $m^2/g$. The calcined product can comprise more than 99% titanium dioxide of the anatase polymorph. In some embodiments, the titanium oxychloride solution can comprises from 2.5 moles to 3.5 moles of titanium ions per liter of solution, for example, from 2.75 moles to 3.25 moles, or from 2.875 moles to 3.0 moles, per liter of solution. The resulting calcined product can exhibit a specific surface area of from 30 $m^2/g$ to 100 $m^2/g$. In some embodiments, the calcined product can comprise more than 99.5% by weight titanium dioxide of the rutile polymorph.

According to various embodiments, sulphate ions can be added to the aqueous titanium oxychloride solution prior to thermal hydrolysis, and the resulting product can comprise more than 50% by weight titanium dioxide of the anatase polymorph. The sulphate ions can be added in an amount to result in a concentration of sulphate ions in a range of from 0.01 mole to 1.0 mole per liter based on the volume of the resulting aqueous titanium oxychloride solution, for example, from 0.1 mole to 0.5 mole, or from 0.14 mole to 0.15 mole, per liter.

In some embodiments, aluminum ions are added to the aqueous titanium oxychloride solution prior to the thermal hydrolysis, and the resulting product can comprise more than 50% by weight titanium dioxide of the rutile polymorph. The amount of aluminum ions added can be an amount that produces a concentration of aluminum ions in a range of from 0.045 mole to 0.15 mole per liter based on the volume of the resulting aqueous titanium oxychloride solution, for example, from 0.07 mole to 0.1 mole, or from 0.080 mole to 0.085 mole, per liter.

In some embodiments, thermal hydrolysis can be carried out at a temperature of from 95° C. to 105° C. Thermal hydrolysis can be carried out at atmospheric pressure, or at a reduced or raised pressure. In some embodiments, thermal hydrolysis is carried out for a period of time time of from one hour to six hours, for example, from one hour to three hours or from one hour to two hours. The method can further comprise drying the filtered neutralized product at a temperature of from 80° C. to 130° C. prior to said calcining, for example, at a temperature in the range of from 90° C. to 120° C., or from 100° C. to 110° C. Drying can occur for a period of time of from one hour to six hours, for example, from two hours to five hours or from two hours to 3 hours, at ambient pressure. In some embodiments, calcining can be carried out after drying. Calcining can be carried out at a temperature of from 300° C. to 700° C., for example, at a temperature of from 400° C. to 600° C. or at a temperature of from 500° C. to 550° C. The calcining can be carried out for a period of time of from one hour to four hours, for example, from one hour to three hours or from one hour to two hours. The calcining can be carried out at a temperature of 800° C. or higher, and the resulting calcined product can comprise greater than 50% by weight of the rutile polymorph. In some embodiments, the method further comprises milling the calcined product, for example, in a fluid energy mill driven by air.

The resulting titanium dioxide crystalline product can have an average particle diameter of less than 40 nm, for example, less than 30 nm or in the range of from 10 nm to 30 nm. In some embodiments, the anatase polymorph nanoparticles produced according to the present teachings can have BET specific surface areas in the range of from 10 $m^2/g$ to 300 $m^2/g$, for example, in the range of from 20 $m^2/g$ to 200 $m^2/g$, or in the range of from 50 $m^2/g$ to 110 $m^2/g$. In some embodiments, the rutile polymorph nanoparticles produced according to the present teachings can have BET specific surface areas in the range of from 10 m²/g to 100 m²/g, for example, in the range of from 20 m²/g to 75 m²/g, or in the range of from 30 m²/g to 60 m²/g. The present teachings also relate to compositions that contain the resultant titanium dioxide nanoparticles, methods of photocatalyzing using the nanoparticles, and methods of blocking UVA and UVB radiation using the nanoparticles.

According to various embodiments, the method produces ultrafine ultrafine anatase and rutile polymorphs of titanium dioxide by using titanium oxychloride as a feedstock and without adding any titanium dioxide crystal nucleating agent. The process can form pure anatase and rutile crystals having particle sizes of from 10 nm to 30 nm and spherical shapes, using a thermal hydrolysis reaction.

According to various embodiments, a method is provided for producing ultrafine anatase and rutile titanium dioxide particles using titanium oxychloride as feedstock without adding any titanium dioxide crystal nucleating agent. The precipitation solution can be free of a nucleating agent. The solution can be free of conventional nucleating agents, including, but not limited to, $TiO_2$, $Al_2O_3$, and $SnO_2$.

According to various embodiments, a method is provided to produce ultrafine anatase and rutile titanium dioxide particles through thermal hydrolysis at a temperature in the range of from 95° C. to 105° C., for example, at atmospheric pressure. In some embodiments, the method comprises producing ultrafine anatase and rutile titanium dioxide particles by precipitating crystalline hydrated titanium dioxide from an aqueous solution of titanium oxychloride. An aqueous solution of titanium oxychloride used for the precipitation of hydrated titanium dioxide can be prepared from titanium tetrachloride, for example, purified titanium tetrachloride. In some embodiments, precipitation of crystalline hydrated titanium dioxide can be performed by thermal hydrolysis of a titanium oxychloride solution at a temperature in the range of from 95° C. to 105° C., and at atmospheric pressure, such that the precipitation occurs under atmospheric pressure.

The titanium oxychloride used to form titanium dioxide of the anatase polymorph of an ultrafine particle size can comprise a titanium content in a percentage solution within the range of from 3.3% (w/v) to 9% (w/v), for example, from 4% (w/v) to 8% (w/v), or from 5% (w/v) to 7% (w/v). The titanium oxychloride that can be used to precipitate ultrafine titanium dioxide of the rutile polymorph can comprise 12% (w/v) to 14% (w/v) titanium ions, for example, from 12.5% (w/v) to 13.5% (w/v), or about 13% (w/v).

In some embodiments, prior to precipitation of hydrated anatase titanium dioxide through hydrolysis, sulphate ions can be introduced to the feedstock solution to promote anatase crystal formation in the presence of chloride ions. The amount of sulfate ions that can be introduced can be from about 2% by weight to about 10% by weight based on the weight of the titanium ions. Any sulphate ion-containing chemical dissolved in water, if it is solid, can be used, for example, sulphuric acid can be used as a source of sulphate ions.

In some embodiments, prior to precipitation of rutile titanium dioxide, $Al^{3+}$ ions are introduced to the titanium oxychloride feedstock. Any aluminium containing compound dissolved in an acid, for example, dissolved in HCl, can be used for this purpose. The amount of $Al^{3+}$ ions added can be in a range of from about 0.1% by weight to about 1.0% by weight, based on the total weight of titanium ions in the total amount of titanium oxychloride feedstock used, for example, the amount of $Al^{3+}$ ions can be from 0.2% by weight to 0.5% by weight, from 0.3% by weight to 0.35% by weight, or about 0.32% by weight. In some embodiments, anhydrous $AlCl_3$ dissolved in HCl can be used as a source of $Al^{3+}$ ions.

Further, the sulphate and $Al^{3+}$ ions can be uniformly mixed with the titanium oxychloride solution prior to the precipitation. Mixing can be facilitated if the ion sources are in a liquid form, and acidic, when added to the titanium oxychloride solution.

In some embodiments, the method can be free of a step of adding a titanium dioxide crystal nucleating agent before or during precipitation. Hence, no special precautions are required at the beginning of precipitation or during the precipitation stage, similar to those precautions that would be needed if a nucleating agent were used. As a result, the precipitation stage is much easier to carry out compared to a precipitation in the presence of a nucleating agent. Furthermore, according to various embodiments of the present teachings, precipitation of anatase and rutile polymorphs was possible using titanium oxychloride as a starting feedstock without adding any nucleating agent. Precipitation occurred within a reasonable time at a temperature of from 95° C. to 105° C., at atmospheric pressure. The precipitate formed according to the present teachings can be driven towards the formation of either the crystalline anatase polymorph or the crystalline rutile polymorph, even before calcination. In some embodiments, calcination can then be carried out to even more fully complete the crystallization and to increase the thermal stability of the product.

According to various embodiments, the thermal hydrolysis can be carried out for up to three hours, for example, for a time period of from one hour to two hours, or of from 80 minutes to 100 minutes, for example, at atmospheric pressure. Precipitation times exceeding three hours can also be used but generally, after three hours, undesired particle growth outside the nanoparticle size range begins to occur.

According to various embodiments, the temperature during precipitation can be maintained within the range of from 95° C. to 105° C., for example, at 100° C. Higher temperatures can be used, but by raising the temperature above 105° C., undesired particle growth can be observed, for example, growth of particles lager than the nanoparticle size range.

In some embodiments, water can be added to the acidic precipitate containing crystalline anatase or crystalline rutile titanium dioxide, to dilute the precipitation product prior to neutralization with a caustic agent. The amount of water to be added can be, for example, an amount of about 50% (w/w). The product is typically filtered off after neutralization and washed in a conventional manner. Washing can be carried out, for example, to minimize residual cations and anions in the product.

The pH of the precipitation product after neutralization can be from 6 to 9, for example, from 7 to 8, or from 7 to 7.5. Neutralization can be carried out with any suitable base, and sodium hydroxide and ammonia are exemplary, alone or in combination. Neutralization can comprise adding caustic soda, for example, sodium hydroxide mixed with water in equal parts by weight (i.e., 50% w/w). Other forms or mixtures or solutions of caustic soda or other neutralizing agents can also be used. The neutralization step can be advantageously performed before filtration to achieve maximum yield, to enhance filtration efficiency, to avoid having a large quantity of highly acidic effluent discharged to a waste stream, or to achieve a combination of these benefits.

After neutralization, the neutralized product can be filtered and washed with water and then dried. Drying temperatures can be from 80° C. to 130° C., for example, from 90° C. to 120° C. or from 100° C. to 110° C. In some embodiments, a drying time of from one hour to six hours can be used, for example, from two hours to five hours or from two hours to three hours. Drying can take place at ambient pressure or at an elevated or reduced pressure.

The dried product can be calcined in a manner familiar to those of skill in the art. Calcination can take place at a temperature of from 300° C. to 700° C., for example, from 400° C. to 600° C. or from 500° C. to 550° C. The length of time for calcination can be up to four hours or more, for example, from one hour to three hours or from one hour to two hours. Calcination at these temperatures and times can have further advantageous effects on the properties of the product, for example, by increasing crystallinity. Increasing the calcination temperature to above 800° C. can be used to irreversibly transform the product to the rutile polymorph, which is the most thermodynamically stable form of titanium dioxide. For some applications, temperatures above 800° C. are avoided for calcinations to avoid significant growth in particle size and to avoid a reduction in specific surface area which would otherwise occur as a result of crystal structure transformation to the rutile polymorph. The calcination step can be carried out at an elevated pressure, at a reduced pressure, or at ambient pressure.

After calcinations, the product can then be ground, for example, in a fluid energy mill run by air.

The particle size of the resulting titanium dioxide anatase and rutile polymorphs described herein can be in the range of from 10 nm to 50 nm, for example, from 20 nm to 40 nm, from 10 nm to 30 nm, or from 20 nm to 30 nm. The particles can be analyzed with a Transmission Electron Micro scope.

The invention is illustrated with reference to, but not limited to, the following examples.

EXAMPLES

Example 1

A solution of titanium oxychloride was prepared by adding distilled water into pure titanium tetrachloride solution kept in an ice bath. The oxychloride solution was diluted to a concentration of 0.687 mole $Ti^{4+}$ per liter. One liter of the diluted solution was placed in a round bottom flask. Sulphate ions were added as sulphuric acid (98%) in an amount of 0.054 mole. The resulting solution was refluxed for 2 hours and the acidic precipitate was diluted to two liters and subsequently neutralized using caustic soda (50% w/w). The precipitate was washed and filtered and then dried at 110° C. for two hours. The dried product was then calcined at a temperature in the range of from 500° C. to 550° C. and subsequently micronized in an air micronizer.

Powder X-ray diffraction analysis showed that the product was 99.9% pure anatase and X-ray fluorescence analysis showed a very pure sample (i.e. contained >99.5% by weight $TiO_2$). The BET surface area of the sample was in the range of from 100 $m^2/g$ to 110 $m^2/g$.

Example 2

A titanium oxychloride solution was diluted with distilled water until a $Ti^{4+}$ solution having a concentration of 1.375 moles per liter was achieved. One liter of the diluted solution was placed in a round bottom flask. Then, 0.108 mole of sulphate ions were added as sulphuric acid (98%). The solution was refluxed for two hours and the acidic precipitate was diluted to two liters and then neutralized using caustic soda (50% w/w). The precipitate was then washed, filtered, and dried at 110° C. for two hours. The dried product was then calcined at a temperature in the range of from 500° C. to 550° C. and subsequently micronized in an air micronizer.

Powder X-ray diffraction analysis showed that the product was 99.9% pure anatase and X-ray fluorescence analysis showed a very pure sample (i.e. >99.5%). The BET surface area of the sample was in the range of from 75 $m^2/g$ to 90 $m^2/g$.

Example 3

A titanium oxychloride solution was diluted with distilled water until a $Ti^{4+}$ solution having a concentration of 1.875 moles per liter $Ti^{4+}$ was achieved. One liter of the diluted solution was placed in a round bottom flask. Then, 0.148 mole of sulphate ions were added as sulphuric acid (98%). The resulting solution was refluxed for two hours and the acidic precipitate was diluted to two liters and then neutralized using caustic soda (50% w/w). The precipitate was then washed, filtered, and dried at 110° C. for two hours. The dried product was then calcined at a temperature in the range of from 500° C. to 550° C. and subsequently micronized in an air micronizer.

Powder X-ray diffraction analysis showed that the product was 99.9% pure anatase and X-ray fluorescence analysis showed that the sample was very pure (i.e., >99.5%). The BET surface area of the sample was in the range of from 50 $m^2/g$ to 60 $m^2/g$. Transmission Electron Microscopic analysis showed that the particles had maximum dimensions in the average size range of from 10 nm to 30 nm.

Example 4

A titanium oxychloride solution was diluted with distilled water until a concentration of 2.25 moles per liter $Ti^{4+}$ solution was achieved. One liter of the diluted solution was placed in Ti a round bottom flask. Then 0.179 mole of sulphate ions were added as sulphuric acid (98%). The resulting solution was refluxed for two hours and the acidic precipitate was diluted to two liters. Subsequently, the diluted precipitate was neutralized using caustic soda (50% w/w). Then the precipitate was washed, filtered, and dried at a temperature of 110° C. for two hours. The dried product was then calcined at a temperature in the range of from 500° C. to 550° C. and subsequently micronized in an air micronizer.

Powder X-ray diffraction analysis showed that the product was 65% anatase and 35% rutile. X-ray fluorescence analysis showed that the sample was very pure (i.e. >99.5%). The BET surface area of the sample was in the range of from 35 $m^2/g$ to 45 $m^2/g$.

Example 5

The method used in Example 3 was repeated except that the duration of hydrolysis was one hour rather than two hours.

Powder X-ray diffraction analysis showed that the product had a 99.9% pure crystalline anatase structure and X-ray fluorescence analysis showed that the sample was very pure (i.e. >99.5%). The BET surface area of the sample was in the range of from 50 $m^2/g$ to 60 $m^2/g$.

Example 6

A titanium oxychloride solution was diluted with distilled water until a concentration of 2.875 moles per liter $Ti^{4+}$ solution was achieved. One liter of the diluted solution was then placed in a round bottom flask. Then, 0.09 mole per liter of Al ions were added as $AlCl_3$ solution and mixed well. This solution was refluxed for two hours and the acidic precipitate was diluted to two liters and then neutralized using caustic soda (50% w/w). The precipitate was washed, filtered, and dried at 110° C. for two hours. The dried product was then calcined at a temperature in the range of from 500° C. to 550° C. and then micronized in an air micronizer.

Powder X-ray diffraction analysis showed that the product was ≧95% pure crystalline rutile and X-ray fluorescence analysis showed that the sample was very pure (>99.5%). The BET surface area of the sample was in the range of from 30 m$^2$/g to 40 m$^2$/g. Transmission Electron Microscopic analysis showed that the particles had an average maximum particle dimension in a size range of from 10 nm to 30 nm.

Comparative Example 1

A titanium oxychloride solution was diluted with distilled water to 1.875 moles per liter Ti$^{4+}$ solution. One liter of the diluted solution was placed in a round bottom flask. Then, 0.03 mole of phosphate ions were added as phosphoric acid (in an 85% aqueous solution). The resulting solution was then refluxed for two hours and the acidic precipitate was diluted to two liters and then neutralized using caustic soda (50% w/w). The precipitate was then washed, filtered, and dried at 110° C. for two hours. The dried product was then calcined at a temperature in the range of from 500° C. to 550° C. and then micronized in an air micronizer.

Powder X-ray diffraction analysis showed that the product was not crystallized like the other samples shown in the other Examples above. It appears that higher temperature was required to crystallize the sample. The BET surface area of the sample was in the range of from 50 m$^2$/g to 60 m$^2$/g and X-ray fluorescence analysis showed 2% phosphate (by weight) present within the sample. As can be seen, phosphate ions added prior to precipitation were precipitated during neutralization.

Comparative Example 2

A titanium oxychloride solution was diluted with distilled water to achieve a concentration of 1.875 moles per liter Ti$^{4+}$ solution. One liter of the diluted solution was placed Ti in a round bottom flask. The solution was refluxed for two hours without adding sulphate ions. The acidic precipitate was diluted to two liters and then neutralized using caustic soda (50% w/w). The precipitate was washed, filtered, and dried at 110° C. for two hours. The dried product was then calcined at a temperature in the range of from 500° C. to 550° C. and micronized in an air micronizer.

Powder X-ray diffraction analysis showed that the product was a mixture of 65% anatase and 35% rutile. X-ray fluorescence analysis showed >99.5% by weight TiO$_2$ content. The BET surface area of the sample was in the range of from 30 m$^2$/g to 40 m$^2$/g.

Comparative Example 3

A titanium oxychloride solution was diluted with distilled water to a concentration of 1.875 moles per liter Ti$^{4+}$ solution. One liter of the diluted solution was placed in a round bottom flask. The solution was then neutralized using caustic soda (50% w/w). The precipitate was washed, filtered, and dried at 110° C. for two hours. The dried product was then calcined at a temperature in the range of from 500° C. to 550° C. and micronized in an air micronizer.

Powder X-ray diffraction analysis showed that the product was a mixture of 16% anatase and 84% rutile with many mixed and intermediate peaks. The BET surface area of the sample was in the range of from 15 m$^2$/g to 25 m$^2$/g.

Comparative Example 4

A titanium oxychloride solution was diluted with distilled water to a concentration of 2.875 moles per liter Ti$^{4+}$ solution. One liter of the diluted solution was placed in a round bottom flask. The solution was refluxed for two hours without adding Al ions and the acidic precipitate was diluted to two liters and then neutralized using caustic soda (50% w/w). The precipitate was washed, filtered, and then dried at 110° C. for two hours. The dried product was then calcined at a temperature in the range of from 500° C. to 550° C. and micronized in an air micronizer.

Powder X-ray diffraction analysis showed that the product was 93% pure crystalline rutile and X-ray fluorescence analysis showed that the sample had very high purity (>99.5%). The BET surface area of the sample was in the range of from 14 m$^2$/g to 20 m$^2$/g.

Test Methods

1. Photocatalytic Activity

Photocatalytic activities of the products from Examples 1-6 and Comparative Examples 1-4 above were measured using a method normally used for pigment durability tests and described in U.S. Pat. Nos. 5,554,216 and 5,824,145. In order to study the photoactivity, slight alteration was done in this method in the duration of exposure to UV radiation. This test was based on the TiO$_2$ catalyzed reduction of lead carbonate to metallic lead under UV radiation. An air sealed dispersion of each sample and lead carbonate in an organic medium was exhibited to turn from white to almost black by exposure to ultraviolet light due to photocatalysis. With highly photoactive samples, the paste turned to dark black. Exposures were conducted for one hour and reflectance before and after UV exposure was measured. The relative ultraviolet reactivity rating was calculated against reference samples of the same composition.

The photoactivity of the samples according to the present teachings were investigated with reference to a commercially available titanium dioxide photocatalyst. The results of the photocatalytic activity testing are given in Table 1.

2. UV Absorbance

UV absorbances of the samples were measured using a UV-visible spectrophotometer having a powder sample testing facility (Lambda 35 Perkin Elmer). The samples were screened from 200 nm to 400 nm and the average absorbance in the UVA region (320 nm to 360 nm) and in the UVB region (280 nm to 320 nm) were calculated. The results are shown in Table 1. The results were compared to the commercially available photocatalyst. As can be seen, all samples showed absorbance throughout the whole UV region with increased absorbance in the more harmful UVB region.

TABLE 1

| Sample description | Surface area (m²/g) | Crystal type (%) | Photoactivity with respect to Commercial Photocatalyst | UV Absorbance Average | |
|---|---|---|---|---|---|
| | | | | UVA 320-360 nm | UVB 280-320 nm |
| Example 1 | 104 | Anatase (100%) | 102 | 3.41 | 4.99 |
| Example 2 | 85 | Anatase (100%) | 105 | 4.29 | 5.82 |
| Example 3 | 55 | Anatase (100%) | 108 | 5.36 | 6.0 |
| Example 4 | 40 | Anatase (65%) | 60 | 1.65 | 1.93 |
| Example 5 | 49 | Anatase (100%) | 72 | 1.73 | 2.80 |
| Example 6 | 34 | Rutile (98%) | 60 | 0.51 | 0.48 |
| Comparative Example 1 | 59 | Not crystallized properly | 98 | 2.61 | 5.78 |
| Comparative Example 2 | 35 | Anatase (65%) | 55 | 1.22 | 1.66 |
| Comparative Example 3 | 20 | Anatase (17%) | 40 | 1.09 | 1.24 |
| Comparative Example 4 | 14 | Rutile (99%) | 55 | 0.40 | 0.42 |
| Degussa P25 | 45 | Anatase (75%) | 100 | 3.07 | 6.0 |

TEM analysis confirmed that all TiO$_2$ materials produced had particle sizes in the nanometer size range of from 5 nm to 100 nm. In addition, all samples produced, when tested, showed superior performance as stable photocatalysts.

The sample in Example No. 3 showed high absorbance in both the UVA as well as the UVB regions and was found to have higher photoactivity compared to the other samples mentioned in the Examples.

Rutile phase formation occurred under the same conditions when the starting solution concentration was increased to 2.875 moles per liter of Ti$^{4+}$, in the presence of Al$^{3+}$ ions.

When the duration of hydrolysis was reduced to one hour a drastic decrease in photoactivity and UV absorbance resulted.

The presence of phosphate ions was not favorable for crystallizing anatase at the calcination temperatures used for the other samples.

Photoactivity and UV absorbance were reduced when phosphate ions were present in the sample.

Thermal hydrolysis of titanyl chloride solution without adding sulphate ions did not lead to pure anatase crystallization.

Neutralization of titanyl oxychloride solution was not favorable for precipitating pure anatase.

The TEM image of the anatase sample produced in Example 3 is shown in FIG. 1. The particles were in the 10 nm to 30 nm size range.

Figure 2:
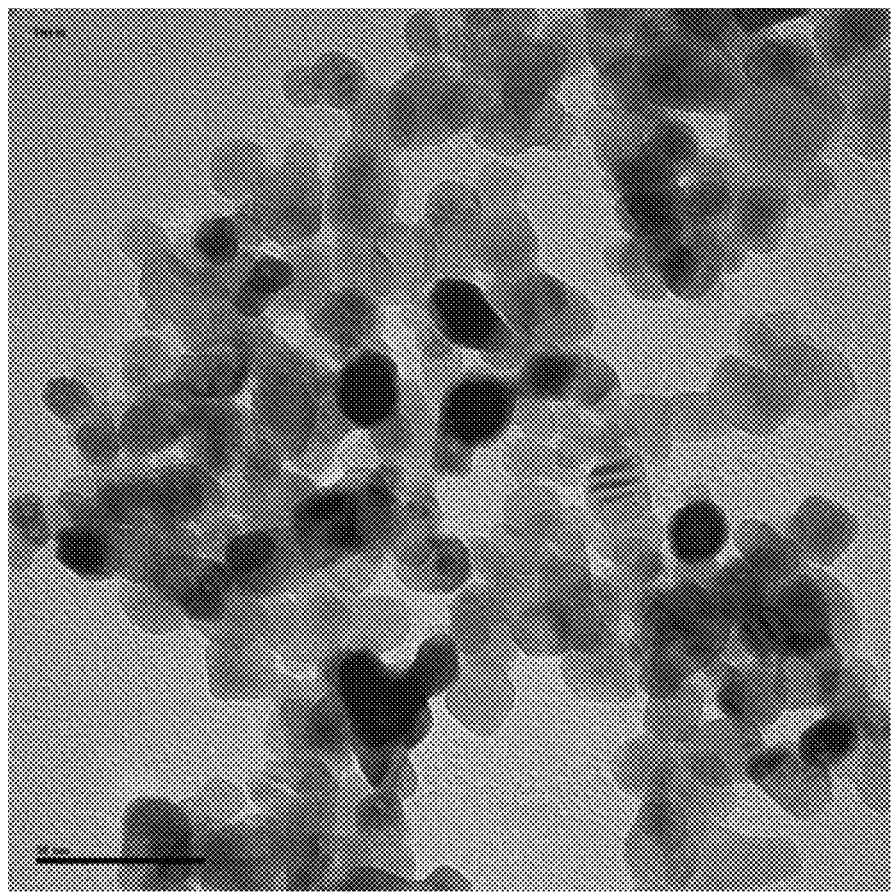
FIG. 2 is a TEM image of rutile titanium dioxide nanoparticles produced in accordance with the embodiment of the present teachings described in connection with Example 6.

The TEM image of the rutile sample produced in Example 6 is shown in FIG. 2. The particles were in the 10 nm to 30 nm size range.

The anatase product showed enhanced absorbance in both the UVA region and the UVB region with increased absorbance in the most harmful UVB region.

The products show excellent performance in photocatalytic removal of harmful oxides of nitrogen, for example, in De-NOx reactions.

All the above samples completely transformed to the rutile polymorph upon calcination at 800° C. for two hours.

In some embodiments, a titanium dioxide crystalline product was produced that comprises 100% anatase polymorph, has an average particle diameter of less than 40 nm, and has a surface area of greater than 45 m²/g.

In some embodiments, a titanium dioxide crystalline product was produced that comprises at least 98% rutile polymorph, has an average particle diameter of less than 40 nm, and has a surface area of greater than 30 m²/g.

The description of illustrative and preferred embodiments of the present teachings is not intended to limit the scope of the present teachings. Various modifications, alternative methods, and equivalents may be employed without departing from the scope of the present teachings. It is intended all such changes and modifications fall within the scope of the present teachings.

What is claimed is:

1. A titanium dioxide crystalline product comprising more than 50% by weight titanium dioxide of the anatase polymorph, the product having an average particle diameter of less than 40 nm, a specific surface area of from 10 m²/g to 300 m²/g, and being produced by a method comprising:
   thermally hydrolyzing an aqueous titanium oxychloride solution free of titanium dioxide nucleating agents, to form a resultant suspension;
   neutralizing the resultant suspension to form a neutralized product;
   filtering the neutralized product to form a filtered neutralized product; and
   calcining the filtered neutralized product to form the crystalline product.

2. The titanium dioxide crystalline product of claim 1, wherein the crystalline product exhibits a specific surface area of from 50 m²/g to 300 m²/g.

3. The titanium dioxide crystalline product of claim 1, wherein the crystalline product exhibits a BET specific surface area of from 30 m²/g to 60 m²/g.

4. The titanium dioxide crystalline product of claim 1, wherein the crystalline product exhibits a BET specific surface area of greater than 45 m²/g.

5. The titanium dioxide crystalline product of claim 1, wherein the crystalline product comprises more than 99% titanium dioxide of the anatase polymorph.

6. The titanium dioxide crystalline product of claim 1, wherein the crystalline product comprises 100% titanium dioxide of the anatase polymorph.

7. The titanium dioxide crystalline product of claim 1, wherein the crystalline product comprises pure titanium dioxide of the anatase polymorph.

8. The titanium dioxide crystalline product of claim 1, wherein the crystalline product has an average particle diameter of less than 30 nm.

9. The titanium dioxide crystalline product of claim 1, wherein the crystalline product has an average particle diameter of from 10 nm to 30 nm.

10. The titanium dioxide crystalline product of claim 1, wherein the crystalline product has a spherical shape.

11. A titanium dioxide crystalline product comprising more than 50% by weight titanium dioxide of the rutile polymorph, having an average particle diameter of less than 40 nm, having a surface area of from 10 m²/g to 100 m²/g, and being produced by a method comprising:
   thermally hydrolyzing an aqueous titanium oxychloride solution free of titanium dioxide nucleating agents, to form a resultant suspension;
   neutralizing the resultant suspension to form a neutralized product;
   filtering the neutralized product to form a filtered neutralized product; and
   calcining the filtered neutralized product to form the crystalline product.

12. The titanium dioxide crystalline product of claim 11, wherein the crystalline product exhibits a specific surface area of from 20 m²/g to 75 m²/g.

13. The titanium dioxide crystalline product of claim 11, wherein the crystalline product exhibits a BET specific surface area of from 30 m$^2$/g to 60 m$^2$/g.

14. The titanium dioxide crystalline product of claim 11, wherein the crystalline product exhibits a BET specific surface area of greater than 30 m$^2$/g.

15. The titanium dioxide crystalline product of claim 11, wherein the calcined product comprises at least 98% by weight titanium dioxide of the rutile polymorph.

16. The titanium dioxide crystalline product of claim 11, wherein the calcined product comprises more than 99.5% by weight titanium dioxide of the rutile polymorph.

17. The titanium dioxide crystalline product of claim 11, wherein the crystalline product has an average particle diameter of less than 30 nm.

18. The titanium dioxide crystalline product of claim 11, wherein the crystalline product has an average particle diameter of from 10 nm to 30 nm.

19. The titanium dioxide crystalline product of claim 11, wherein the crystalline product has a spherical shape.

* * * * *